US007922878B2

(12) United States Patent
Logan

(10) Patent No.: US 7,922,878 B2
(45) Date of Patent: *Apr. 12, 2011

(54) ELECTROHYDROGENIC REACTOR FOR HYDROGEN GAS PRODUCTION

(75) Inventor: Bruce Logan, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 398 days.

This patent is subject to a terminal disclaimer.

(21) Appl. No.: 12/145,722

(22) Filed: Jun. 25, 2008

(65) Prior Publication Data

US 2008/0277273 A1 Nov. 13, 2008

Related U.S. Application Data

(63) Continuation-in-part of application No. 11/799,194, filed on May 1, 2007, which is a continuation-in-part of application No. 11/180,454, filed on Jul. 13, 2005, now Pat. No. 7,491,453.

(60) Provisional application No. 60/588,022, filed on Jul. 14, 2004, provisional application No. 60/608,703, filed on Sep. 10, 2004, provisional application No. 60/796,761, filed on May 2, 2006, provisional application No. 60/945,991, filed on Jun. 25, 2007.

(51) Int. Cl.
*C25B 9/04* (2006.01)

(52) U.S. Cl. ............... 204/270; 204/272; 204/275.1; 204/276; 204/278; 205/637; 205/638; 429/2; 429/401; 429/501; 429/503

(58) Field of Classification Search .............. 429/2, 401, 429/502, 503; 204/242, 252, 260, 263, 264, 204/266, 269, 270, 272, 275.1, 276, 278; 205/637, 638; 422/305; 435/297.1, 298.1, 300.1

See application file for complete search history.

(56) References Cited

U.S. PATENT DOCUMENTS

| 4,652,501 A | 3/1987 | Bennetto et al. |
| 4,891,404 A | 1/1990 | Narayan et al. |
| 5,256,501 A | 10/1993 | Hasvold et al. |

(Continued)

FOREIGN PATENT DOCUMENTS

WO WO-9103079 3/1991

(Continued)

OTHER PUBLICATIONS

Oh, S. et al., Proton exchange membrane and electrode surface areas as factors that affect power generation in microbial fuel cells, *Applied Microbiology and Biotechnology*, 70:162-169, 2006.

(Continued)

*Primary Examiner* — Bruce F Bell
(74) *Attorney, Agent, or Firm* — Gifford, Krass, Sprinkle, Anderson & Citkowski, P.C.

(57) ABSTRACT

A system for hydrogen gas generation is provided according to the present invention which includes a hydrogen gas electrode assembly including a first anode in electrical communication with a first cathode; a microbial fuel cell electrode assembly including a second anode in electrical communication with a second cathode, the microbial fuel cell electrode assembly in electrical communication with the hydrogen gas electrode assembly for enhancing an electrical potential between the first anode and the first cathode. A single chamber housing contains the hydrogen gas electrode assembly at least partially in the interior space of the housing.

16 Claims, 2 Drawing Sheets

U.S. PATENT DOCUMENTS

| | | | |
|---|---|---|---|
| 5,427,871 | A | 6/1995 | Garshol et al. |
| 5,683,558 | A | 11/1997 | Sieck et al. |
| 5,753,098 | A * | 5/1998 | Bess et al. ............... 205/501 |
| 5,976,719 | A | 11/1999 | Kim et al. |
| 6,090,266 | A | 7/2000 | Roychowdhury |
| 6,217,822 | B1 | 4/2001 | Borglum |
| 6,887,692 | B2 | 5/2005 | Paterek |
| 7,491,453 | B2 * | 2/2009 | Logan et al. ............... 429/2 |
| 7,709,113 | B2 * | 5/2010 | Logan et al. ............... 429/2 |
| 2002/0025469 | A1 | 2/2002 | Heller |
| 2004/0094406 | A1 | 5/2004 | Sawada |
| 2005/0095466 | A1 | 5/2005 | Minteer et al. |
| 2006/0011491 | A1 | 1/2006 | Logan et al. |
| 2006/0147763 | A1 | 7/2006 | Angenent et al. |
| 2006/0160200 | A1 | 7/2006 | Rathenow et al. |
| 2006/0172186 | A1 | 8/2006 | Tender |
| 2006/0234110 | A1 | 10/2006 | Bergel |
| 2007/0042480 | A1 | 2/2007 | Rozendal et al. |
| 2007/0062820 | A1 | 3/2007 | Smotkin |
| 2007/0172710 | A1 | 7/2007 | Kruesi |
| 2007/0259216 | A1 | 11/2007 | Logan |
| 2007/0259217 | A1 | 11/2007 | Logan |
| 2008/0220292 | A1 | 9/2008 | Rabaey et al. |
| 2008/0251445 | A1 | 10/2008 | Kamleiter et al. |
| 2008/0277273 | A1 | 11/2008 | Logan |
| 2008/0286624 | A1 | 11/2008 | Lovley et al. |
| 2008/0292912 | A1 | 11/2008 | Logan |
| 2009/0029198 | A1 | 1/2009 | Jin et al. |

FOREIGN PATENT DOCUMENTS

| | | |
|---|---|---|
| WO | WO-0139306 | 5/2001 |
| WO | WO-2004/015172 | 2/2004 |
| WO | WO-2005005981 | 1/2005 |
| WO | WO-2007/010313 | 1/2007 |
| WO | WO-2008/063843 | 5/2008 |
| WO | WO-2008/109962 | 9/2008 |

OTHER PUBLICATIONS

Logan, B. et al., Graphite Fiber Brush Anodes for Increased Power Production in Air Cathode Microbial Fuel Cells, *Environmental Science and Technology*, 41:3341-3346, 2007.

Oh, S. et al., Cathode Performance as a Factor in Electricity Generation in Microbial Fuel Cells, *Environmental Science and Technology*, 38:4900-4904, 2004.

Liu, H. et al., Power Generation in Fed-Batch Microbial Fuel Cells as a Function of Ionic Strength, Temperature, and Reactor Configuration, *Environmental Science and Technology*, 39:5488-5493, 2005.

Cheng, S. et al., Increased Power Generation in a Continuous Flow MFC with Adjective Flow through the Porous Anode and Reduced Electrode Spacing, *Environmental Science and Technology*, 40:2426-2432, 2006.

Logan, B. et al., Microbial Fuel Cells: Methodology and Technology, *Environmental Science and Technology*, 40:5181-5192, 2006.

Cheng, S. et al., Ammonia treatment of carbon cloth anodes to enhance power generation of microbial fuel cells, *Electrochemistry Communications*, 9:492-496, 2007.

Cheng, S. et al., Power Densities Using Different Cathode Catalysts (Pt and CoTMPP) and Polymer Binders (Nafion and PTFE) in Single Chamber Microbial Fuel Cells, *Environmental Science and Technology*, 40:364-369, 2006.

Cheng, S. et al., Increased performance of single-chamber microbial fuel cells using an improved cathode structure, *Electrochemistry Communications*, 8:489-494, 2006.

Liu, H. et al., Electrochemically Assisted Microbial Production of Hydrogen from Acetate, *Environmental Science and Technology*, 39:4317-4320, 2006.

Liu, H. et al., Electricity Generation Using an Air-Cathode Single Chamber Microbial Fuel Cell in the Presence and Absence of a Proton Exchange Membrane, Environmental Science and Technology, 38:4040-4046, 2004.

Liu, H. et al., Production of Electricity during Wastewater Treatment Using a Single Chamber Microbial Fuel Cell, Environmental Science and Technology, 38:2281-2285, 2004.

Liu, H. et al., Production of Electricity from Acetate or Butyrate Using a Single-Chamber Microbial Fuel Cell, Environmental Science and Technology, 39: 658-662, 2004.

Kim, J. et al., Power Generation Using Different Cation, Anion, and Ultrafiltration Membranes in Microbial Fuel Cells, Environmental Science and Technology, 41: 1004-1009, 2007.

Zuo, Y. et al., Electricity Production from Steam-Exploded Corn Stover Biomass, Energy and Fuels, 20:1716-1721, 2006.

Kim, J. et al., Evaluation of procedures to acclimate a microbial fuel cell for electricity production, *Applied Microbiology and Biotechnology*, 68:23-30, 2005.

Logan, B. et al., Electricity-producing bacterial communities in microbial fuel cells, *TRENDS in Microbiology*, 14: 512-518, 2006.

Chiou, C. et al., Contaminant Sorption by Soil and Bed Sediment, U.S. Department of the Interior, U.S. Geological Survey: Reston, VA, 2000.

Rabaey, K. et al., Microbial Fuel Cells for Sulfide Removal, *Environmental Science and Technology*, 40:5218-5224, 2006.

Reimers, C. et al., Harvesting Energy from the Marine Sediment-Water Interface, *Environmental Science and Technology*, 35:192-195, 2001.

Finkelstein, D. et al., Effect of Electrode Potential on Electrode-Reducing Microbiota, *Environmental Science and Technology*, 40:6990-6995, 2006.

He, Z. et al., An Upflow Microbial Fuel Cell with an Interior Cathode: Assessment of the Internal Resistance by Impedance Spectroscopy, *Environmental Science and Technology*, 40:5212-5217, 2006.

Cai, M. et al., Enhanced Biohydrogen Production from Sewage Sludge with Alkaline Pretreatment, *Environmental Science and Technology*, 38:3195-3202, 2004.

Hasvold, O. et al., Sea-water battery for subsea control systems, *Journal of Power Sources*, 65:253-261, 1997.

Hasvold, O. et al., Electrochemical power sources for unmanned underwater vehicles used in deep sea survey operations, *Journal of Power Sources*, 96: 252-258, 2001.

Cooper, K. et al., Electrical test methods for on-line fuel cell ohmic resistance measurement, *Journal of Power Sources*, 160:1088-1095, 2006.

Tender, L. et al., Harnessing microbially generated power on the seafloor, *Nature Biotechnology*, 20:821-825, 2002.

Chaudhuri, S. et al., Electricity generation by direct oxidation of glucose in mediatorless microbial fuel cells, *Nature Biotechnology*, 21:1229-1232, 2003.

Lovley, D., Microbial Energizers: Fuel Cells That Keep on Going, *Microbe*, 1: 323-329, 2006.

Lowy, D. et al., Harvesting energy from the marine sediment—water interface II Kinetic activity of anode materials, *Biosensors and Bioelectronics*, 21:2058-2063, 2006.

Brennan, R. et al., Chitin and corncobs as electron donor sources for the reductive dechlorination of tetrachloroethene, Water Research, 40:2125-2134, 2006.

Niessen, J. et al., Fluorinated polyanilines as superior materials for electrocatalytic anodes in bacterial fuel cells, *Electrochemistry Communications*, 6:571-575, 2004.

Park, D. et al., Improved Fuel Cell and Electrode Designs for Producing Electricity from Microbial Degradation, *Biotechnology and Bioengineering*, 81:348-355, 2003.

Kim, N. et al., Effect of Initial Carbon Sources on the Performance of Microbial Fuel Cells Containing Proteus vulgaris, *Biotechnology and Bioengineering*, 70:109-114, 2000.

Bond, D. et al., Electrode-Reducing Microorganisms that Harvest Energy from Marine Sediments, *Science*, 295:483-485, 2002.

Bond, D. et al., Electricity Production by Geobacter sulfurreducens Attached to Electrodes, *Applied and Environmental Microbiology*, 69:1548-1555, 2003.

Park, D. et al., Electricity Generation in Microbial Fuel Cells Using Neutral Red as an Electronophore, *Applied and Environmental Microbiology*, 66:1292-1297, 2000.

Lovley, D. et al., Anaerobic Oxidation of Toluene, Phenol, and p-Cresol by the Dissimilatory Iron-Reducing Organism, GS-15, *Applied and Environmental Microbiology*, 56:1858-1864, 1990.

Rabaey, K. et al., A microbial fuel cell capable of converting glucose to electricity at high rate and efficiency, *Biotechnology Letters*, 25:1531-1535, 2003.

Park, H. et al., A Novel Electrochemically Active and Fe(III)-reducing Bacterium Phylogenetically Related to Clostridium butyricum Isolated from a Microbial Fuel Cell, *Anaerobe*, 7:297-306, 2001.

Park, D. et al., Impact of electrode composition on electricity generation in a single-compartment fuel cell using Shewanella putrefaciens, Applied Microbiology and Technology, 59:58-61, 2002.

Raz, S. et al., Supported mixed-gas fuel cells, *Solid State Ionics*, 149:335-341, 2002.

Reimers, C. et al., Microbial Fuel Cell Energy from an Ocean Cold Seep, *Geobiology*, 4:123-136, 2006.

Kim, H. et al., A mediator-less microbial fuel cell using a metal reducing bacterium, Shewanella putrefaciens, *Enzyme and Microbial Technology*, 30:145-152, 2002.

Svitil, A. et al., A chitin-binding domain in a marine bacterial chitinase and other microbial chitinases: implications for the ecology and evolution of 1, 4-β-glycanases, *Microbiology*, 144:1299-1308, 1998.

Lovley, D. et al., Novel Mode of Microbial Energy Metabolism: Organic Carbon Oxidation Coupled to Dissimilatory Reduction of Iron or Manganese, *Applied and Environmental Microbiology*, 54:1472-1480, 1988.

Allen, R. et al., Microbial fuel-cells: electricity production from carbohydrates, *Applied biochemistry and biotechnology*, 39-40:27-40, 1993.

Logan, B., Extracting Hydrogen and Electricity from Renewable Resources, *Environmental Science and Technology*, 38:160A-166A, 2004.

Grant, P., Hydrogen lifts off—with a heavy load, *Nature*, 424:129-130, 2003.

Gross, R. et al., Progress in renewable energy, *Environment International*, 29:105-122, 2003.

Nath, K. et al., Improvement of fermentative hydrogen production: various approaches, *Applied Microbiology and Biotechnology*, 65:520-529, 2004.

Miyake, J. et al., Biotechnological hydrogen production: research for efficient light energy conversion, *Journal of Biotechnology*, 70:89-101, 1999.

Woodward, J. et al., Enzymatic production of biohydrogen, *Nature*, 405:1014-1015, 2000.

Cheng, H. et al., Intensification of Water Electrolysis in a Centrifugal Field, *Journal of the Electrochemical Society*, 149:D172-D177, 2002.

Logan, B. et al., Biological Hydrogen Production Measured in Batch Anaerobic Respirometers, *Environmental Science and Technology*, 36:2530-2535, 2002.

Min, B. et al., Continuous Electricity Generation from Domestic Wastewater and Organic Substrates in a Flat Plate Microbial Fuel Cell, *Environmental Science and Technology*, 38:5809-5814, 2004.

Logan, B. et al., Electricity generation from cysteine in a microbial fuel cell, *Water Research*, 39:942-952, 2005.

Cheng, S. et al., Optimization of Air Cathode used in One-Chamber Microbial Fuel Cells, Extended Abstract, *Proc. 228$^{th}$ American Chemical Society Annual Meeting*, 2004.

Angenent, L., Production of bioenergy and biochemicals from industrial and agricultural wastewater, *TRENDS in Biotechnology*, 22:477-485, 2004.

Zuo, Y. et al., Tubular Membrane Cathodes for Scalable Power Generation in Microbial Fuel Cells, *Environmental Science and Technology*, 41:3347-3353, 2007.

He, Z., S.D. Minteer, and L.T. Angenent. "Electricity Generation from Artificial Wastewater Using an Upflow Microbial Fuel Cell." Environmental Science and Technology 2005, vol. 39, p. 5262-5267.

Yu, E.H., Cheng, S., Scott, K., Logan, B.E., Microbial fuel performance with non-Pt cathode catalysts, J. Power Sources, 171(2):275-281 (2007).

Cheng, S., Logan, B.E., Sustainable and efficient biohydrogen production via electrohydrogenesis, PNAS, 104(47):18871-18873 (2007).

Call, D., Logan, B.E., Hydrogen production in a single chamber microbial electrolysis cell lacking a membrane, Environ. Sci. Technol., 42(9):3401-3406 (2008).

Xing, D., Zuo, Y., Cheng, S., Regan, J.M., Logan, B.E., Electricity generation by *Rhodopseudomonas palustris*, DX-1, Environ. Sci. Technol., 42: 4146-4151, 2008.

Chen, Weifang, Cannon, Fred S., Rangel-Mendez, Jose R., Ammonia-Tailoring of GAC to enhance perchlorate removal. I: Characterization of $NH_3$ thermally tailored GACs, Carbon 43 (2005) 573-580.

Chen, Weifang, Cannon, Fred S., Rangel-Mendez, Jose R., Ammonia-tailoring of GAC to enhance perchlorate removal. II: Perchlorate adsorption, Carbon 43 (2005) 581-590.

Min, B., "Perchlorate remediation using packed-bed bioreactors and electricity generation in microbial fuel cells (MFCs)," Thesis submitted to The Pennsylvania State University, The Graduate School, Department of Civil and Environmental Engineering, May 2005.

Benemann, J. et al., Novel Photobiological Hydrogen Production Process, *Proceedings of the 13$^{th}$ International Congress on Photosynthesis* (Montreal, Canada) 2004 Eds, Van der Est and Bruce, p. 878-880.

Rezaei, F., Substrate-Enhanced Microbial Fuel Cells for Improved Remote Power Generation from Sediment-Based Systems, *Environmental Science & Technology*, 41(11): 4053-58, 2007.

Ditzig, J., Production of hydrogen from domestic wastewater using a bioelectrically assisted microbial reactor (BEAMR), *International Journal of Hydrogen Energy*, 32: 2296-2304, 2007.

Ringeisen, B., A miniature microbial fuel cell operating with an aerobic anode chamber, *Journal of Power Sources*, 165: 591-597, 2007.

Ren, Z., Characterization of the cellulolytic and hydrogen-producing activities of six mesophilic *Clostridium species*, *Journal of Applied Microbiology*, 103: 2258-2266, 2007.

Biffinger, J., Engineering Microbial Fuels Cells: Recent Patents and New Directions, *Recent Patents on Biotechnology*, 2: 150-155, 2008.

Cord-Ruwisch, R., Growth of *Geobacter sulfurreducens* with Acetate in Syntrophic Cooperation with Hydrogen-Oxidizing Anaerobic Partners, *Applied and Environmental Microbiology*, 64(6): 2232-2236, Jun. 1998.

Ren, Z., Electricity Production from Cellulose in a Microbial Fuel Cell Using a Defined Binary Culture, *Environmental Science & Technology*, 41(13): 4781-4786, 2007.

Logan, B.E., Transport of Chemicals Present as Pure Phases, p. 399-405 in Environmental Transport Processes, John Wiley & Sons. 1999.

Dumas, C., et al., Marine microbial fuel cell: Use of stainless steel electrodes as anode and cathode materials, *Electrochimica Acta*, 53: 468-473, 2007.

Bergel, A., Catalysis of oxygen reduction in PEM fuel cell by seawater biofilm, *Electrochemistry Communications*, 7: 900-904, 2005.

Zuo, Y. et al., Ioin Exchange Membrane Cathodes for Scalable Microbial Fuel Cells, *Environmental Science & Technology*, 42(18): 6967-6972, 2008.

\* cited by examiner

ELECTROHYDROGENIC REACTOR FOR HYDROGEN GAS PRODUCTION

REFERENCE TO RELATED APPLICATION

This application claims priority from U.S. Provisional Patent Application Ser. No. 60/945,991, filed Jun. 25, 2007. This application is also a continuation-in-part of U.S. patent application Ser. No. 11/180,454, filed Jul. 13, 2005, which claims priority from U.S. Provisional Patent Application Ser. Nos. 60/588,022, filed Jul. 14, 2004 and 60/608,703, filed Sep. 10, 2004. This application is also a continuation-in-part of U.S. patent application Ser. No. 11/799,194, filed May 1, 2007, which claims priority from U.S. Provisional Patent Application Ser. No. 60/796,761, filed May 2, 2006. The entire content of which is incorporated herein by reference.

GOVERNMENT SUPPORT

This invention was made with government support under Contract Nos. BES-0401885 and CBET-0730359 awarded by the National Science Foundation. The government has certain rights in the invention.

FIELD OF THE INVENTION

The present invention generally relates to systems for producing hydrogen gas from biodegradable organic matter using bacteria as a biocatalyst.

BACKGROUND OF THE INVENTION

The global interest in a hydrogen economy has been stimulated by the promise of clean energy production using hydrogen in fuel cells. A reduction in $CO_2$ emissions, however, will require sustainable hydrogen production based on renewable energy using solar, wind and biomass sources. Currently about half of all the hydrogen produced is derived from natural gas, with the balance produced primarily using other fossil fuels, including heavy oils, naphtha and coal. Only 4% is generated from water using electricity derived from a variety of sources. Hydrogen can be produced from certain forms of biomass by biological fermentation, but yields are low.

Thus, there is a continuing need for improved methods and apparatus for hydrogen production.

SUMMARY OF THE INVENTION

A system for hydrogen gas generation according to embodiments of the present invention is described herein which includes an anode, a cathode, and a conductive connector connecting the anode and cathode. A power source is included which is in electrical connection with the anode and cathode for enhancing an electrical potential between the anode and cathode. A single chamber housing is provided which has a wall generally enclosing and defining an interior space and the anode and the cathode are disposed at least partially in the interior space. No ion exchange membrane or separator is disposed between the anode and the cathode.

In operation, an aqueous medium is disposed in the interior space of the housing. The aqueous medium partially fills the interior space and thereby defines a gas space between the wall of the housing and the aqueous medium. Further, in operation substantially no $O_2$ is present in the interior space of the housing and a plurality of exoelectrogenic bacteria for oxidizing a biodegradable organic fuel is present in the interior space of the housing. Optionally, the aqueous medium includes a chemical mediator for transfer of electrons generated by the plurality of bacteria to the anode.

A biodegradable organic substrate for oxidation by bacteria is present in the interior space of the housing in particular embodiments of the present invention. Optionally, the biodegradable organic fuel is wastewater.

In particular embodiments of a system for hydrogen gas generation according to the present invention an included anode and/or cathode has a high specific surface area. For example, an included anode and/or cathode has a specific surface area greater than $100\ m^2/m^3$.

In some embodiments of a system for hydrogen gas generation according to the present invention two or more anodes and/or two or more cathodes are present in the interior space of the reaction chamber housing.

In a particular embodiment of a system for hydrogen gas generation according to the present invention the power source is a microbial fuel cell configured to produce electrical current and substantially no hydrogen gas.

Methods of generating hydrogen gas according to embodiments of the present invention are described which include providing a biodegradable organic substrate to a plurality of bacteria disposed in the housing of a system for generating hydrogen gas described herein and applying a voltage to enhance an electrical potential between the anode and the cathode.

A system for hydrogen gas generation is provided according to embodiments of the present invention which includes a hydrogen gas electrode assembly including a first anode and a first cathode. Further included is a microbial fuel cell electrode assembly including a second anode and a second cathode. The microbial fuel cell electrode assembly is in electrical communication with the hydrogen gas electrode assembly for enhancing an electrical potential between the first anode and the first cathode.

In particular embodiments, a single chamber housing is provided which has a wall generally enclosing and defining an interior space and an electrode assembly including electrodes disposed at least partially in the interior space. In particular embodiments, the electrodes of a hydrogen gas electrode assembly are substantially or entirely disposed in the interior space. No ion exchange membrane or separator is disposed between an anode and a cathode of a hydrogen gas electrode assembly in preferred embodiments. In contrast, where used as a power source, an ion exchange membrane is optionally disposed between an anode and a cathode of a microbial fuel cell electrode assembly.

In operation, an aqueous medium is disposed in the interior space of the housing. The aqueous medium partially fills the interior space and thereby defines a gas space between the wall of the housing and the aqueous medium. Further, in operation substantially no $O_2$ is present in the interior space of the housing and a plurality of exoelectrogenic bacteria for oxidizing a biodegradable organic fuel is present in the interior space of the housing. $O_2$ is present in contact with a cathode of the microbial fuel cell electrode assembly.

A system for hydrogen gas generation is provided according to embodiments of the present invention which includes single chamber microbial hydrogen gas-generating system without an ion exchange membrane.

A system for hydrogen gas generation is provided according to embodiments of the present invention which includes a single chamber microbial hydrogen gas-generating system without an ion exchange membrane in which hydrogen gas evolves from the cathode into a headspace in the single chamber.

DETAILED DESCRIPTION OF THE INVENTION

Figure 1:
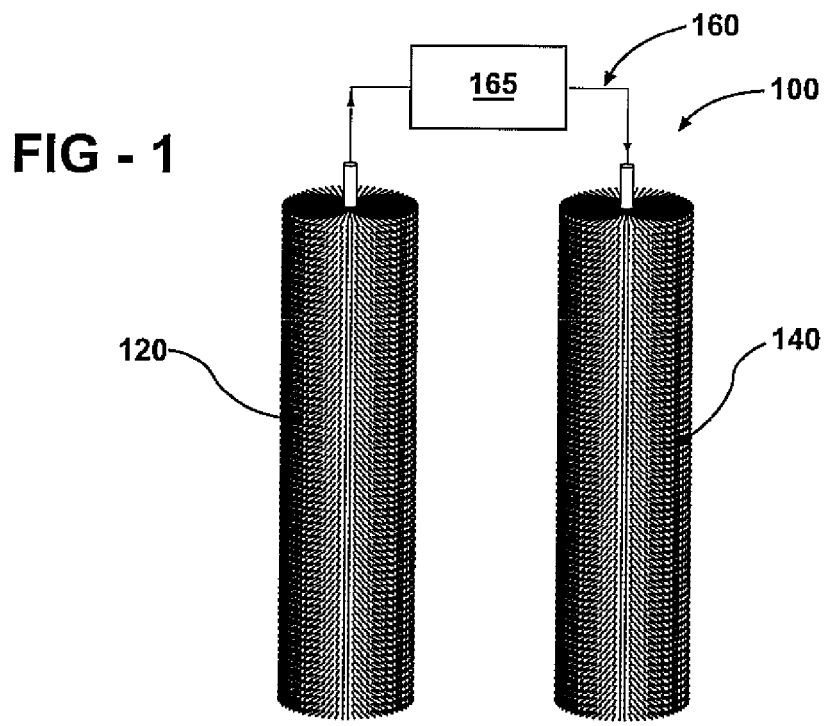
FIG. 1 is a graphic representation of a single electrode assembly module for use in a system that generates hydrogen in one exemplary configuration where both electrodes are high specific surface area electrodes connected to a power source.

An electrohydrogenic reactor, interchangeably described herein as a "system for generation of hydrogen gas", a "bio-electrochemically assisted microbial reactor" (BEAMR), and a "microbial electrolysis cell" (MEC), is a type of microbial fuel cell configured to produce hydrogen. A system for generation of hydrogen gas according to embodiments of the present invention includes an anode, a cathode, a conductive connector connecting the anode and cathode and a power source in electrical connection with the anode and cathode for enhancing an electrical potential between the anode and cathode. In operation, a provided oxidizable substrate is oxidized by microbes which generate electrons and protons. Where the substrate is an organic substrate, carbon dioxide is also produced. The electrons generated by the bacteria are transferred to the anode, and, through a conductive connector, to the cathode. A power source is activated to enhance an electrical potential between the anode and cathode. Oxygen is substantially excluded from the cathode area in a system for generation of hydrogen gas such that protons and electrons combine at the cathode, producing hydrogen.

In contrast to systems for hydrogen gas generation according to the present invention are standard microbial fuel cells configured to produce current. Broadly described, a standard microbial fuel cell is configured to produce current using microbes to generate of electrons from a substrate oxidizable by the microbes. A microbial fuel cell for current production generally includes an anode, a cathode, an electron conductor connecting the anode and cathode, and a plurality of exoelectrogenic microbes. A separator such as a cation exchange, anion exchange or neutral charge membrane is optionally disposed between the anode and cathode.

Broadly describing operation of a microbial fuel cell configured to produce current, a provided oxidizable substrate is oxidized by exoelectrogenic microbes which generate electrons and protons. Where the substrate is an organic substrate, carbon dioxide is also produced. The electrons are transferred to the anode, and, through a load such as a device to be powered, to the cathode. Protons and electrons react with oxygen at the cathode, producing water.

A system for hydrogen gas generation according to the present invention is useful in various applications, such as in wastewater treatment, or in renewable energy production, for example. A system for hydrogen gas generation according to the present invention may be used to power a device, such as a portable electronic device. A system for hydrogen gas generation according to the present invention is advantageously used in a remote device, such as a marine sensor.

In particular embodiments of a system for hydrogen gas generation according to the present invention, a single chamber housing houses the anode and cathode. The housing has a wall which generally encloses and defines an interior space in the housing adjacent the interior surface of the wall. The wall generally separates the interior space from the exterior and the anode and the cathode are disposed at least partially in the interior space. A system for hydrogen gas generation does not include an ion exchange membrane or separator disposed between the anode and cathode in preferred embodiments.

A channel is disposed in the wall of the housing for communication between the interior space and the exterior in particular embodiments. For example, an inlet and/or outlet passage through the wall allows for delivery of material into and/or out of the interior space of the housing.

A system for hydrogen gas generation includes an aqueous medium disposed in the interior space of the housing. The aqueous medium partially fills the interior space of the housing and a gas space is defined between the wall of the housing and the aqueous medium in particular embodiments of an inventive system.

A plurality of bacteria for oxidizing a biodegradable organic substrate is disposed in the housing. In operation, bacteria are present in the housing of a system according to the present invention along with biodegradable organic substrate. The bacteria break down the organic substrate, or a biodegradation product of the substrate, yielding protons and electrons. The protons are released into the aqueous medium and are transferred through the aqueous medium to the cathode, either as single protons or as part of another chemical such as a phosphate anion. The electrons are transferred to the anode, either directly by bacteria or indirectly, by transfer from a chemical mediator. An electrically conductive connector in electrical communication with the anode and cathode provides a conduit for electrons to move through the circuit from the anode to the cathode.

A power source is used to increase the voltage of the circuit, provided for example by a potentiostat, a conventional power source powered for example by electricity from the grid, electricity generated on site or remotely using various methods such as solar, wind, or others, including electricity generated using one or more separate or self-contained microbial fuel cells. Power sources used are not limited and further examples of a power source suitable for use in an inventive system illustratively include a DC power source and an electrochemical cell such as a battery or capacitor. The applied voltages are typically larger than approximately 0.2 V, and voltages in the range from about 0.001 to 1 V may be used in particular applications. It is appreciated that increasing the anode potential will result in a need for less added voltage to the circuit.

Optionally, hydrogen produced by a system for generating hydrogen according to the present invention is used in a hydrogen-powered fuel cell configured as a power source for a system for generating hydrogen and thereby providing at least part of the voltage used in the system for generating hydrogen.

Thus, protons and electrons combine at the cathode to produce hydrogen gas, an electrohydrogenic reaction.

The reaction of protons and electrons to form hydrogen gas can be catalyzed by a suitable catalyst such as platinum.

It is appreciated that hydrogen gas may be generated in a system according to the present invention by mechanisms other than an electrohydrogenic reaction. For example, bacteria in the aqueous medium that are not in direct contact with the anode may directly transfer electrons to the cathode, creating hydrogen gas. In addition, using particular substrates, bacteria in the medium can produce hydrogen gas by fermentation. Thus, hydrogen gas from sources other than an electrohydrogenic reaction is present in the aqueous medium in a system of the present invention and may be collected and/or used along with electrohydrogenically produced hydrogen gas.

Bacteria included in a system for hydrogen gas generation according to the present invention may be substantially pure cultures of a single type of isolated bacteria, co-cultures of two or more types of isolated bacteria, mixtures of two or more types of isolated bacteria, cultured separately, and/or an uncharacterized culture of isolated bacteria.

The plurality of bacteria may include exoelectrogenic bacteria. The terms "exoelectrogenic bacteria" and "anodophilic bacteria" as used interchangeably herein refer to bacteria that transfer electrons to an electrode, either directly or indirectly. In general, exoelectrogenic bacteria are obligate or facultative anaerobes.

Examples of exoelectrogen bacteria include bacteria selected from the families Aeromonadaceae, Alteromonadaceae, Clostridiaceae, Comamonadaceae, Desulfuromonaceae, Enterobacteriaceae, Geobacteraceae, Pasturellaceae, and Pseudomonadaceae. These and other examples of bacteria suitable for use in an inventive system are described in Bond, D. R., et al., Science 295, 483-485, 2002; Bond, D. R. et al., Appl. Environ. Microbiol. 69, 1548-1555, 2003; Rabaey, K., et al., Biotechnol. Lett. 25, 1531-1535, 2003; U.S. Pat. No. 5,976,719; Kim, H. J., et al., Enzyme Microbiol. Tech. 30, 145-152, 2002; Park, H. S., et al., Anaerobe 7, 297-306, 2001; Chauduri, S. K., et al., Nat. Biotechnol., 21:1229-1232, 2003; Park, D. H. et al., Appl. Microbiol. Biotechnol., 59:58-61, 2002; Kim, N. et al., Biotechnol. Bioeng., 70:109-114, 2000; Park, D. H. et al., Appl. Environ. Microbiol., 66, 1292-1297, 2000; Pham, C. A. et al., Enzyme Microb. Technol., 30: 145-152, 2003; and Logan, B. E., et al., Trends Microbiol., 14(12):512-518.

Bacteria included in a system for hydrogen gas production of the present invention may be provided as a pure culture of isolated bacteria which can accomplish electron transfer to the electrodes directly or indirectly. Additionally, mixed cultures of bacteria may be included in an inventive system. In general, the efficiency of a process for producing hydrogen gas using a system of the present invention can be increased by acclimation of cultures for the purposes of generating electricity. For example, including bacteria or mixtures of bacteria that do not consume the hydrogen gas produced in the process will increase process efficiency.

Specialized pure cultures of bacteria are optionally included in a system for producing hydrogen gas according to the present invention. In particular embodiments, bacteria are included which consume little or no hydrogen. For example, the iron reducing bacterium *Geobacter metallireducens* is a known exoelectrogen, and it does not readily use hydrogen gas when grown on iron (Lovley, Giovannoni et al. 1993; Cord-Ruwisch, Lovley et al. 1998) and by extension of those properties when grown in a microbial fuel cell and/or system for producing hydrogen gas of the present invention. Another example of an exoelectrogen is *Clostridium butyricum* EG3 (Park et al. 2001, Anaerobe). These bacteria can bioelectrolyze a substrate such as acetate into electrons and protons, and the hydrogen gas evolved at the cathode would not be substantially used by these bacteria. Other bacteria such as other *Geobacter* sp. can be used as well, although some use hydrogen gas to varying extents.

Other electricity-producing bacteria could be genetically engineered so that they do not use hydrogen, but do use fuels other than acetate. Acclimation, genetic mutation through engineered or random variants that arise in laboratory cultures, or the use of other bacteria could all be used to achieve the goals of hydrogen gas production within a single chamber system of the present invention. Using specific bacteria can help increase process efficiency in terms of conversion efficiency of turning the substrate into hydrogen gas, production rates in terms of increasing the rate at which hydrogen gas is produced per reactor volume, limiting unwanted side reactions such as sulfide production, and increasing Coulombic efficiency in terms of the flow of electrons in the substrate into hydrogen gas as opposed to biomass, i.e. the growth of new bacteria.

Additional bacteria can be included to facilitate degradation of various substrates into forms suitable for oxidation by exoelectrogenic bacteria. For example, a co-culture of a cellulose-degrading bacterium such as *Clostridium cellulolyticum* and *Geobacter metallireducens* or other such species could be placed together in a single reactor (Ren, Ward et al. 2007; Ren, Ward et al. 2007). *C. cellulolyticum* can degrade cellulose or other substrates like starch and glucose to hydrogen and various organic substrates oxidizable by exoelectrogens, such as acetic acid, butyric acid, and other compounds. These organic substrates can then be used by an exoelectrogen such as *G. metallireducens* to make hydrogen gas in a system according to the present invention.

The aqueous medium optionally includes a chemical mediator for transfer of electrons generated by bacteria to the anode. Such mediators are exemplified by ferric oxides, neutral red, anthraquinone-1,6-disulfonic acid (ADQS) and 1,4-napthoquinone (NQ). Mediators are optionally chemically bound to the anode, or the anode modified by various treatments, such as coating, to contain one or more mediators.

A biodegradable organic substrate is disposed in the housing and is bioavailable to bacteria disposed therein. A biodegradable substrate included in a microbial fuel cell according to embodiments of the present invention is oxidizable by anodophilic bacteria or biodegradable to produce a material oxidizable by anodophilic bacteria.

Any of various types of biodegradable organic matter may be used as a substrate for bacteria in a system according to the present invention, including carbohydrates, amino acids, fats, lipids and proteins, as well as animal, human, municipal, agricultural and industrial wastewaters. Naturally occurring and/or synthetic polymers illustratively including carbohydrates such as chitin and cellulose, and biodegradable plastics such as biodegradable aliphatic polyesters, biodegradable aliphatic-aromatic polyesters, biodegradable polyurethanes and biodegradable polyvinyl alcohols. Specific examples of biodegradable plastics include polyhydroxyalkanoates, polyhydroxybutyrate, polyhydroxyhexanoate, polyhydroxyvalerate, polyglycolic acid, polylactic acid, polycaprolactone, polybutylene succinate, polybutylene succinate adipate, polyethylene succinate, aliphatic-aromatic copolyesters, polyethylene terephthalate, polybutylene adipate/terephthalate and polymethylene adipate/terephthalate.

Organic substrates oxidizable by anodophilic bacteria are known in the art. Illustrative examples of an organic substrate oxidizable by anodophilic bacteria include, but are not limited to, monosaccharides, disaccharides, amino acids, straight chain or branched $C_1$-$C_7$ compounds including, but not limited to, alcohols and volatile fatty acids. In addition, organic substrates oxidizable by anodophilic bacteria include aromatic compounds such as toluene, phenol, cresol, benzoic acid, benzyl alcohol and benzaldehyde. Further organic substrates oxidizable by anodophilic bacteria are described in Lovely, D. R. et al., Applied and Environmental Microbiology 56:1858-1864, 1990. In addition, a provided substrate may be provided in a form which is oxidizable by anodophilic bacteria or biodegradable to produce an organic substrate oxidizable by anodophilic bacteria.

In embodiments of the present invention where a current producing microbial fuel cell is a power source for a hydrogen gas generating system, the bacteria used in the microbial fuel cell can be the same as those in the hydrogen gas generating system.

Specific examples of organic substrates oxidizable by anodophilic bacteria include glycerol, glucose, acetate, butyrate, ethanol, cysteine and combinations of any of these or other oxidizable organic substances.

The term "biodegradable" as used herein refers to an organic material decomposed by biological mechanisms illustratively including microbial action, heat and dissolution. Microbial action includes hydrolysis, for example.

Biodegradable substrates such as those described in detail in U.S. patent application Ser. No. 11/799,149 may be used in systems and methods of the present invention.

In a particular embodiment, a biodegradable substrate is produced in a bioreactor used to generate one or more organic substrates oxidizable by exoelectrogens to produce hydrogen gas in a system according to the present invention. For example, fermentation of glucose, and/or hydrolysis of a polymer such as cellulose and fermentation to produce one or more volatile acids may be accomplished and the produced volatile acids subsequently used for hydrogen production in a system of the present invention. Thus, in particular embodiments, production of a biodegradable substrate for bacteria is performed in a first bioreactor, with the biodegradable substrate-containing effluent of that bioreactor fed into the housing of a system for hydrogen gas production. Hydrogen gas, if produced in the first reactor, can also be captured for use. Each of these reactors can be operated in batch mode, fed-batch mode, or continuous flow mode.

The electrodes included in a system for hydrogen gas generation of the present invention can be made of any suitably conductive material, for example graphite fibers wound onto a central core of non-corrosive metal, randomly arranged graphite fibers, carbon paper or carbon cloth, graphite granules, reticulated vitreous carbon (RVC), non-corrosive metals such as titanium and stainless steel. The electrode may contain a conductive material as a part of its construction or a coating may be placed on the outside or inside of a structural material. One or more coatings may be placed on the electrodes in order to allow the material to become electrically conductive. Such formulations exist and are commercially produced, typically for use as lubricants, for example products of Superior Graphite, formulations ELC E34, Surecoat 1530.

One or more additional coatings may be placed on one or more electrode surfaces.

Such additional coatings may be added to act as cathode protection layers or diffusion layers, for example.

A cathode optionally contains one or more cathode shielding materials. Such a shielding material may preferably include a layer of a shielding material disposed on any cathode surface, including an inner cathode surface, that is, a cathode surface present in the interior volume of the reaction chamber, and an outer surface, that is, a cathode surface exterior to the reaction chamber. A cathode surface exterior to the reaction chamber is likely to be present where a gas cathode is used, where the exterior cathode surface is in contact with a gas.

A cathode protective layer, for instance, may be used to prevent contact of bacteria or other materials with the cathode surface in both electrode assemblies for current producing systems and for hydrogen gas generation systems. A cathode protection layer for a current producing microbial fuel cell system can be used as a support for bacterial colonization such that bacteria scavenge oxygen in the vicinity of the cathode so it does not leak into the reactor and it may not directly contact the cathode.

Thus, in particular embodiments, an inner cathode surface is protected by a cathode protection layer (CPL). A function of the CPL is to protect the cathode from biofouling of the catalyst. Further, a CPL reduces diffusion of carbon dioxide to the cathode so as to limit methane formation from both abiotic and biotic sources, or from the action of bacteria, at the cathode. In embodiments of an inventive system, a CPL is configured such that it is in contact with an inner surface of a cathode. Thus, for instance, a CPL may be configured to cover the inner surface of the cathode partially or wholly, such as by bonding of the CPL to the cathode.

Optionally, in a further embodiment, a CPL is present in the interior of a reaction chamber but not in contact with the cathode. The inclusion of such a CPL defines two or more regions of such a reactor based on the presence of the CPL. The CPL can be proton, liquid, and/or gas permeable barriers, such as a filter. For example, a filter for inhibiting introduction of large particulate matter into the reactor may be positioned between the anode and cathode such that material flowing through the reaction chamber between the anode and cathode passes through the filter. Alternatively or in addition, a filter may be placed onto the cathode, restricting the passage of bacteria-sized particles to the cathode. Further, a filter may be positioned between an inlet channel and/or outlet channel and the interior of the reaction chamber or a portion thereof. Suitable filters may be configured to exclude particles larger than 0.01 micron-1 micron for example. In particular embodiments, a CPL includes a "proton diffusion layer" for selectively allowing passage of material to the vicinity of a cathode. In one embodiment, a diffusion layer includes an ion exchange material. Any suitable ion conducting material which conducts protons may be included in a proton exchange membrane. For example, a perfluorinated sulfonic acid polymer membrane may be used. In particular, a proton exchange membrane such as NAFION, that conducts protons, may be used for this purpose.

In particular embodiments of the present invention, a diffusion layer includes an anion exchange material. In a preferred embodiment the diffusion layer includes an anion exchange material that conducts anions, associated with protons produced by anodophilic bacteria, to the cathode, such as a quaternary amine styrene divinylbenzene copolymer. An included diffusion layer further functions to inhibit diffusion of gas to or from a cathode relative to the anode chamber. Without wishing to be bound by theory it is believed that the protons associated with the negatively charged, anionic, ion exchange groups, such as phosphate groups, specifically allow passage of negatively charged anions that contain positively charged protons but overall carry a net negative charge, and not allowing passage of positively charged ions and reducing the diffusion of hydrogen into the anode chamber. Such a diffusion layer allows for efficient conduction of protons across the barrier while inhibiting backpassage of hydrogen. An example of such a diffusion layer material is the anion exchange membrane AMI-7001, commercially supplied by Membranes International, Glen Rock, N.J. In addition to membrane form, the diffusion layer can also include an anion conducting material applied as a paste directly to a cathode. In a preferred embodiment, an anion exchange material can be used to contain the catalyst applied to a cathode.

A diffusion layer for an electrode assembly for a current producing microbial fuel cell system can be configured to allow oxygen diffusion to the catalyst from the air-facing side into the conductive electrode matrix, and it may be designed to reduce oxygen diffusion into the system, as described in Cheng, S., et al., 2006, Electrochem. Comm. 8:489-494.

In particular embodiments, an outer surface of a cathode is covered partially or preferably wholly by a cathode diffusion layer (CDL). The CDL may be directly exposed to the gas phase and is preferably bonded to the cathode to prevent water leakage through the cathode from the interior of the reaction chamber. Further, the CDL is hydrogen permeable, allowing hydrogen to freely diffuse from the catalyst in the cathode into a gas collection chamber, gas conduit or other component of a gas collection system. A CDL may further provide support for the cathode and may further form a portion of a wall of a reaction chamber. A CDL can also help to reduce bacteria from reaching the cathode and fouling the surface. A CDL includes a hydrogen permeable hydrophobic polymer material such as polytetrafluoroethylene (PTFE) or like materials. The thickness of this material can be varied or multiple layers can be applied depending on the need to reduce water leakage.

An anode included in a system for hydrogen gas generation of the present invention may be chemically treated to increase its performance, for example by treatment with ammonia gas as described in Cheng and Logan, Electrochem. Commun. 2007, 9, 492-496. For example, a brush anode is treated with a heated ammonia gas, such as $NH_3$ gas. In a specific embodiment, a brush anode is heated to 700° C. and incubated with $NH_3$ gas for about one hour. Another example of a chemically treated anode is a brush anode electrode coated with a material known to increase the conductivity of electrons from bacteria to a surface. Examples of materials which increase the conductivity of electrons from bacteria to a surface include, but are not limited to, neutral red, $Mn^{4+}$, $Fe_3O_4$, $Ni^{2+}$, fluorinated polyanilines, such as poly(2-fluoroaniline) and poly(2,3,5,6-tetrafluoroaniline) for example, anthraquinone-1,6-disolfonic acid (AQDS), 1,4-naphthoquinone (NQ), and combinations of any of these.

A cathode can be made of the same or a different material as the anode in a system for hydrogen gas generation of the present invention, with or without chemical treatment.

A cathode may contain a catalyst such as Pt to reduce electrode overpotential and increase rates of hydrogen gas evolution. Suitable catalysts are known in the art and include metal catalysts, such as a noble metal. Suitable catalyst metals illustratively include platinum, nickel, copper, tin, iron, palladium, cobalt, tungsten, and alloys of such metals. While a catalyst metal such as platinum is included in a cathode in one embodiment of an inventive system, the platinum content may be reduced, for example to as little as 0.1 mg/cm² without affecting energy production. In further embodiments, an included catalyst includes a non-noble metal containing catalyst such as CoTMPP.

Additional catalysts include tungsten carbide, WC, which has been shown to have relatively high activity for $H_2$ evolution under acidic conditions, one order-of-magnitude less than Pt, and work described in Rosenbaum, M., et al., 2006, Angew. Chem. int. Ed. 45(40):6658-6661 indicates WC is a promising catalyst for $H_2$ oxidation in a biohydrogen microbial fuel cell. The activity of tungsten-based materials may be due to the fact that it adsorbs hydrogen as described in Marinović, V., et al., 2006, J. Appl. Electrochem. 36:1005-1009. Other catalysts possible are Ni-based alloys described in Marinović, V., et al., 2006, supra, CoTMPP described in Cheng, S., Liu, H. and Logan, B. E., 2006, Environ. Sci. Technol. 40:364-369, and Fe compounds described in Zhao, F., et al., 2005, Electrochem. Commun., 7:1405-1410, and Zhong, H., et al., 2007, S. Power Sour. 164:572-577; and Pt and $Ni_2P$ described in Liu, B. and Rodriguez, J. A., 2005, J. Am. Chem. Soc. 127:14871-14878.

Optionally, bacteria on the cathode can be used to facilitate electron transfer from the cathode to aid in hydrogen evolution.

A catalyst can be coated onto a cathode by a chemical reaction, chemical precipitation, or through electrochemical deposition, for example.

An anode and cathode may have any of various shapes and dimensions and are positioned in various ways in relation to each other. In one embodiment, the anode and the cathode each have a longest dimension, and the anode and the cathode are positioned such that the longest dimension of the anode is parallel to the longest dimension of the cathode. In another option, the anode and the cathode each have a longest dimension, and the anode and the cathode are positioned such that the longest dimension of the anode is perpendicular to the longest dimension of the cathode. Further optionally, the anode and the cathode each have a longest dimension, and the anode and the cathode are positioned such that the longest dimension of the anode is perpendicular to the longest dimension of the cathode. In addition, the anode and the cathode may be positioned such that the longest dimension of the anode is at an angle in the range between 0 and 90 degrees, or between 0 and 180 degrees, with respect to the longest dimension of the cathode.

Electrodes of various sizes and shapes may be included in an inventive system. In general, an anode has a surface having a surface area present in the reaction chamber and the cathode has a surface having a surface area in the reaction chamber. In one embodiment, a ratio of the total surface area of anodes to surface area of cathodes in an inventive system is about 1:1. In one embodiment, the anode surface area in the reaction chamber is greater than the cathode surface area in the reaction chamber. This arrangement has numerous advantages such as lower cost where a cathode material is expensive, such as where a platinum catalyst is included. In addition, a larger anode surface is typically advantageous to provide a growth surface for anodophiles to transfer electrons to the anode. In a further preferred option a ratio of the anode surface area in the reaction chamber to the cathode surface area in the reaction chamber is in the range of 1.5:1-1000:1 and more preferably 2:1-10:1.

Electrodes may be positioned in various ways to achieve a desired spacing between the electrodes. For example, a first electrode may be positioned such that its longest dimension is substantially parallel to the longest dimension of a second electrode. In a further embodiment, a first electrode may be positioned such that its longest dimension is substantially perpendicular with respect to the longest dimension of a second electrode. Additionally, a first electrode may be positioned such that its longest dimension is at an angle between 0 and 90 degrees with respect to the longest dimension of a second electrode.

Optionally, an anode and/or cathode included in a system for hydrogen gas generation of the present invention has a high specific surface area. In particular embodiments, an anode and/or cathode has a specific surface area greater than 100 m²/m³. Specific surface area is here described as the total surface area of the anode per unit of anode volume. Electrode specific surface area greater than 100 m²/m³ contributes to power generation in a system according to embodiments of the present invention. In further embodiments, an electrode having a specific surface area greater than 1000 $m^2/m^3$ is included. In still further embodiments, an electrode having a specific surface area greater than 5,000 $m^2/m^3$ is included in a system according to embodiments of the present invention. In yet further embodiments, fuel cells according to the present invention include an anode having a specific surface area greater than 10,000 $m^2/m^3$ is included in a system according to embodiments of the present invention. An electrode configured to have a high specific surface area allows for scaling of a system according to the present invention.

Particular high specific surface area anodes and/or cathodes include one or more conductive fibers. The one or more conductive fibers may be attached to a conductive core support to form a brush-like structure. Optionally, each individual fiber of the one or more conductive fibers is attached to the conductive core support. In a further option, at least a portion of the one or more fibers includes one or more carbon fibers.

A brush electrode is included in particular embodiments which has a specific surface area greater than 100 $m^2/m^3$. A brush anode includes one or more conductive fibers. In particular embodiments the one or more fibers are attached to a support. A plurality of fibers is attached to the support and the fibers extend generally radially from the support in specific embodiments. A brush electrode optionally includes a centrally disposed support having a longitudinal axis.

Brush electrodes include a variety of configurations illustratively including various twisted wire brush configurations and strip brush configurations. For example, a particular twisted wire brush configuration includes a support formed from two or more strands of wire and fibers attached between the wires. In a further example, a strip brush configuration includes fibers attached to a conductive backing strip, the strip attached to the support.

Fibers of a brush electrode are electrically conductive and are in electrical communication with the support and with a cathode. In particular embodiments, fibers and/or support of a brush anode provide a support for colonization by anodophilic bacteria, such that the brush anode is preferably substantially non-toxic to anodophilic bacteria.

In particular embodiments, fibers of a brush anode include a metallic and/or non-metallic conductive material which is substantially non-toxic to anodophilic bacteria.

In a specific example, fibers of a brush electrode include carbon fibers. Carbon fibers are optionally substantially composed of graphite. In a further option, a carbon material is mixed with a conductive polymer to form a fiber. In still further embodiments, a polymer fiber is coated with a conductive carbon material.

The electrodes included in a system for hydrogen gas generation of the present invention can be placed in various configurations relative to each other. An example of a single electrode assembly module 100 is shown in FIG. 1, where a brush anode 120 is connected to a brush cathode 140 by a conductive connector 160. A power source 165 is shown in electrical connection with the connector 160.

According to particular embodiments, a system for hydrogen gas generation includes two or more anodes and/or two or more cathodes. Optionally, two or more anodes and/or two or more cathodes are disposed in a single housing or reaction chamber.

One or more electronic components for regulating the current flow in a circuit are optionally included in a system for hydrogen gas generation of the present invention. Examples of such electronic components include, but are not limited to, a switch, a resistor, a capacitor, a fuse, a transformer, a diode, a transistor and a sensor.

For example, optionally, a resistor is included in the circuit for the purposes of enabling the monitoring of the current through the measurement of the voltage drop across the resistor. For example a resistor having a resistance in the range of about 1-10 ohms may be used.

In a further option, a mixing apparatus is included in a system of the present invention for increasing hydrogen gas transfer from the cathode to the gas space.

The housing is optionally sparged with gas, for example nitrogen or carbon dioxide gases to assist in dislodging biomass on the electrodes, or air to inactivate or kill unwanted bacteria that are unable to tolerate oxygen (such as obligate anaerobes or methanogens). Sparging may be performed periodically or episodically. The housing optionally includes a sweeper device to collect biomass that falls to the bottom of the housing or rises to the top of the housing, or a separate downstream settling device or filtration device can be used for the purpose of removing bacteria. Additional conventional or microbial fuel cell treatment systems can be used to further remove organic matter wastes remaining in the aqueous medium. The aqueous medium may be discharged or reused. The tank may have systems to adjust solution chemical characteristics, for example through pH control or control of foaming or electrode fouling.

A channel is included defining a passage from the exterior of the housing to the interior space of the housing in particular embodiments. More than one channel may be included to allow and/or regulate flow of materials into and out of the housing. For example, a channel may be included to allow for inflow and/or outflow of a gas, such as hydrogen gas and/or a sweep gas. Further, a channel may be included to allow for inflow of a liquid or solid, such as a biodegradable organic substrate.

In a particular embodiment, a system for hydrogen gas generation is configured for continuous flow of material into and/or out of the housing. Thus, in one embodiment of a continuous flow configuration, a channel is included to allow flow of a substance into the housing and a separate channel may be used to allow outflow of a substance from the housing. More than one channel may be included for use in any inflow or outflow function.

A regulator device, such as a valve, may be included to further regulate flow of materials into and out of the housing. Further, a cap or seal is optionally used to close a channel A pump may be provided for enhancing flow of liquid or gas into and/or out of the housing in particular embodiments.

A system for hydrogen gas generation according to the present invention may be used to treat wastewater in particular embodiments. In further embodiments, a source of renewable biomass is a source of a biodegradable organic substrate included in a system for hydrogen gas generation according to the present invention.

In an embodiment of a system for hydrogen gas generation according to the present invention, a power source is an electrical current-producing microbial fuel cell.

An electrical current-producing microbial fuel cell includes an electrode assembly including an anode, a cathode and an electrically conductive connector connecting the anode and the cathode. The anode and cathode of the electrode assembly of the electricity-producing microbial fuel cell are at least partially disposed in a reaction chamber. The reaction chamber may have one or more compartments, such as an anode compartment and a cathode compartment typically separated by a membrane, for instance, by a cation exchange membrane. Alternatively, the reaction chamber may be a single compartment configuration. One or more channels may be included in a reaction chamber for addition and removal of various substances such as substrates for bacterial metabolism and products such as hydrogen. In operation, bacteria are present in the anode reaction chamber along with biodegradable organic substrate. The bacteria break down the organic substrate, or a biodegradation product of the substrate, yielding protons and electrons. The protons are released into the aqueous medium and are conveyed through the aqueous medium to the cathode. The electrons are transferred to the anode, either directly by bacteria or indirectly, by transfer from a chemical mediator. An electrically conductive connector in electrical communication with the anode and cathode provides a conduit for electrons to move through the circuit from the anode to the cathode, thereby generating current which can be used as a power source for a system for generating hydrogen gas according to the present invention.

Electrodes used in a microbial fuel cell used to power a hydrogen gas generating system may be any of various electrodes, including, but not limited to, a high surface area electrode exemplified by a brush electrode.

A "tube" cathode is optionally included in an electrode assembly of a microbial fuel cell used to power a hydrogen gas generating system of the present invention. Broadly described, a tube cathode includes a wall formed at least in part by an ion exchange membrane. Particular cathodes for a microbial fuel cell used as a power source for a hydrogen generation system according to embodiments of the present invention are provided which include a membrane. The membrane forms a cathode wall having any desired shape such as generally tubular or slab-shaped. The cathode wall has an external surface and an internal surface, defining an interior space adjacent the internal surface and an exterior adjacent the external surface. The wall extends between a first end and a second end of the cathode.

The membrane forming the wall is a separator such as a nanofiltration membrane, an ultrafiltration membrane, or an ion exchange membrane. The membrane forming the wall is optionally an electrically conductive membrane in electrically conductive connection with the electrically conductive connector. In particular embodiments, a conductive material is in contact with the internal surface or the external surface of the membrane, the conductive material in electrically conductive connection with the electrically conductive connector. A conductive material is optionally a carbon-based material, such as graphite in particular embodiments.

Where a conductive material is present on the membrane, the conductive material is present on at least about 50% of the internal surface and/or the external surface of the membrane.

In particular embodiments, a catalyst for enhancement of oxygen reduction or a catalyst for enhancement of proton reduction is in direct or indirect contact with the cathode membrane.

A tube cathode included in a microbial fuel cell used to power a hydrogen gas generating system of the present invention is open at one or both ends of its length to an oxygen-containing medium. In particular embodiments, a tube cathode included in a microbial fuel cell configured for electricity generation is open at one or both ends to ambient air. Optionally, at least one of the first or second ends of the wall is sealed to exclude oxygen from the interior of the housing of a hydrogen gas generating system of the present invention.

High surface area electrodes and tube cathodes for use in electricity-producing microbial fuel cells and/or a system for hydrogen gas generation of the present invention are described in detail in U.S. patent application Ser. No. 11/799,194.

Configurations

In an embodiment in which an electricity-producing microbial fuel cell is a power source included in a system for hydrogen gas generation, one or more electricity-producing microbial fuel cells are in electrical communication with a system for hydrogen gas generation to enhance an electrical potential between at least one anode and at least one cathode of the system for hydrogen gas generation. Optionally, one or more additional power sources of the same or different type are in electrical communication with a system for hydrogen gas generation to enhance an electrical potential between at least one anode and at least one cathode of the system for hydrogen gas generation. For example, a microbial fuel cell and one or more additional power sources such as solar, wind, a DC power source, an electrochemical cell such as a battery or capacitor, or others may be used.

Figure 2:
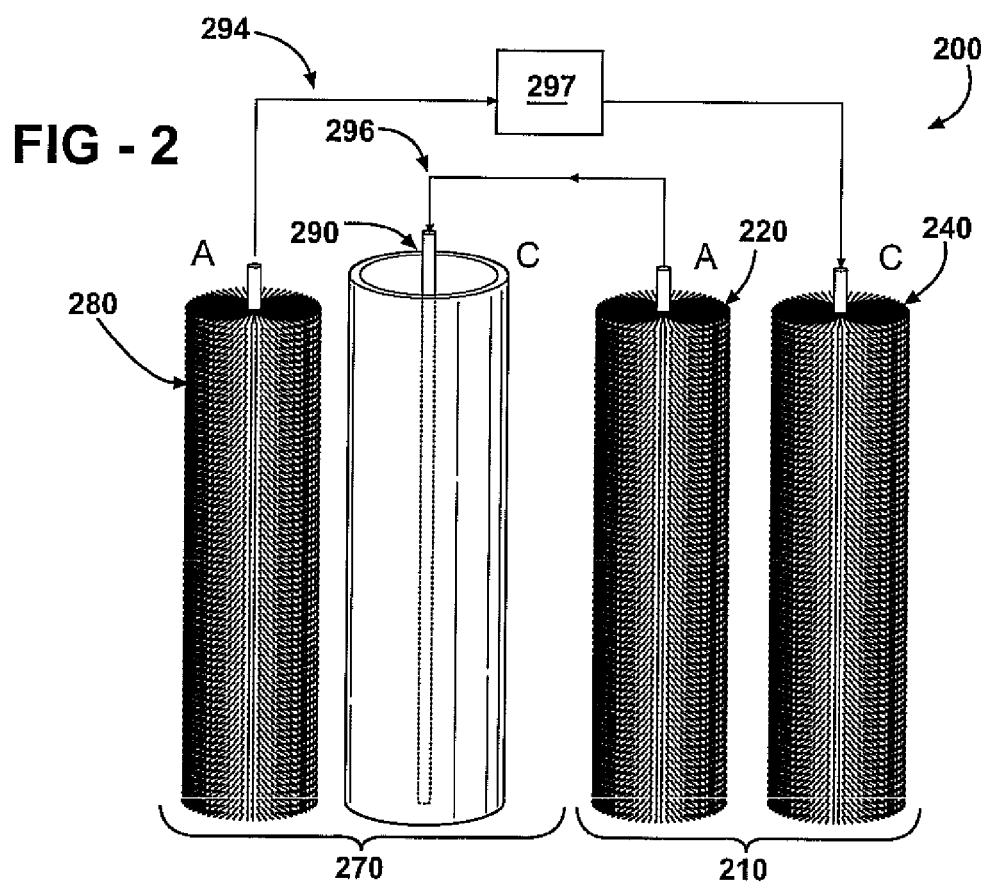
FIG. 2 is a graphic representation of one type of electrode assembly module for a current producing microbial fuel cell in electrical communication with one type of electrode assembly module for a hydrogen gas generating system of the present invention, where the current producing microbial fuel cell is a power source for the hydrogen gas generating system.

FIG. 2, illustrates a current-generating microbial fuel cell in electrical communication to act as a power source for a system for hydrogen gas generation according to embodiments of the present invention. A combined module 200 is illustrated which includes an electrode assembly for a current-generating microbial fuel cell 270 and an electrode assembly for a hydrogen generation module 210. The electrode assembly for a current-generating microbial fuel cell 270 and an electrode assembly for a hydrogen generation module 210 are preferably disposed in separate reaction housings.

The illustrated microbial fuel cell electrode assembly 270 includes an anode 280, here shown as a brush anode, and a cathode 290, here shown as a tubular cathode incorporating an ion exchange membrane. Electrically conductive connectors connects the anode 280 and the cathode 290. The electrode assembly for the hydrogen gas generating module 210 includes an anode 220 and a cathode 240, both shown as brush electrodes in this example. Electrically conductive connectors connect the anode 220 and the cathode 240. Electrically conductive connectors 294 and 296 are shown connecting the electrode assembly modules 210 and 270 to enhance an electrical potential between the anode 220 and the cathode 240 of a system for hydrogen gas generation.

Box 297 schematically represents one or more optional electronic components for regulating the current flow from an electrode assembly for a current-generating microbial fuel cell 270. Examples of electronic components for regulating the current flow include, but are not limited to, a switch, a resistor, a capacitor, a fuse, a transformer, a diode, a transistor and a sensor.

A microbial fuel cell in operation requires oxygen at the cathode in order to produce electricity to power a system for hydrogen gas generation. Since oxygen is excluded from preferred embodiments of a hydrogen gas generating system of the present invention, the air or oxygen present at the cathode or cathodes of a microbial fuel cell is isolated from the rest of the microbial fuel cell and system for hydrogen gas generation.

For example, oxygen may be confined to the interior of a tubular cathode such as shown at 290 in FIG. 2.

Figure 3:
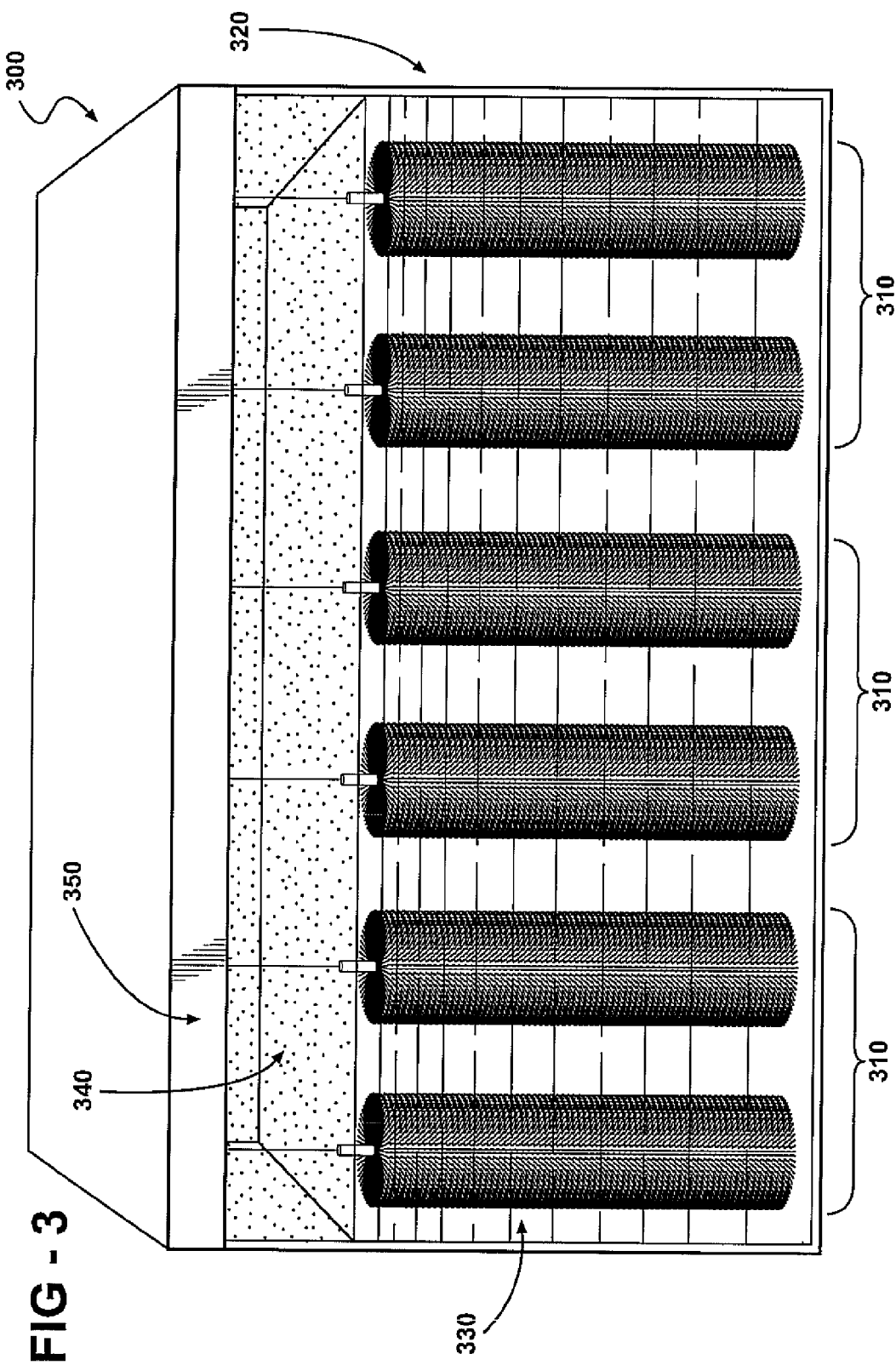
FIG. 3 is a graphic representation of an embodiment of a hydrogen gas generating system of the present invention including a series of electrode assembly modules in a single chamber housing or reactor where generated hydrogen gas collects in the headspace in the reactor.

One or more electrode assembly modules are disposed in a single chamber housing in a system for a hydrogen gas generation according to embodiments of the present invention. FIG. 3 illustrates a system for hydrogen gas generation 300 according to an embodiment of the present invention which includes electrode assembly modules 310 disposed in a single chamber housing having a wall 320. Each electrode assembly module 310 includes an anode and a cathode.

One or more portions of the wall 320 are optionally partially or completely detachable from one or more other portions of the wall. For example, a portion of the wall 320 may form a detachable lid.

The wall 320 defines an interior space which is at least partially filled with an aqueous medium 330. The wall 320 and the aqueous medium together define a gas space 340 into which hydrogen gas evolves from the cathodes.

An electrically conductive connector 350 connects the electrodes and the electrode assemblies 310 so that the anodes are linked together in parallel and connected to the cathodes in the illustrated example. Regulatory components or other electronics are optionally included, for instance, in electrical connection with the connector 350. Illustrative examples of a regulatory components or other electronics include a switch, a resistor, a transistor, a capacitor and a transformer. A power source is in electrical connection with the electrodes to enhance an electrical potential between the anodes and cathodes.

The types of electrodes and relative sizes of the anode and cathodes can be varied, and the orientation of the electrodes can vary. In particular embodiments, one or more cathodes are positioned in the housing so as to increase mass transfer of generated hydrogen gas into the gas space. For example, one or more cathodes may be placed to increase the amount of surface area of the cathode in proximity to a gas space in the housing. Referring to the exemplary embodiment shown in FIG. 3, one or more of the cathodes may be positioned so that the long axis of the cathodes is approximately parallel to connector 350 and close to gas space 340.

Where brush electrodes are used, the number of brushes for each electrode, and relative sizes and shapes can be varied.

In certain embodiments of a system for hydrogen gas generation according to the present invention, hydrogen gas provides some or all of the power for the system for hydrogen gas generation. For example, a portion of the hydrogen gas produced by a system for hydrogen gas generation according to the present invention is used in a fuel cell or internal combustion engine to generate at least a portion of the power to be added to the circuit of the system for hydrogen gas generation according to the present invention.

Methods of generating hydrogen gas are provided according to embodiments of the present invention which include providing a biodegradable organic substrate to a plurality of bacteria disposed in the housing of a system for generating hydrogen gas and applying a voltage to enhance an electrical potential between at least one anode and at least one cathode.

An aqueous medium in a reaction chamber of a system of the present invention is formulated to be non-toxic to bacteria in contact with the aqueous medium in the fuel cell. Further, the medium or solvent may be adjusted to a be compatible with bacterial metabolism, for instance by adjusting pH to be in the range between about pH 2-10, preferably about 5-8.5, inclusive, by adding a buffer to the medium or solvent if necessary, and by adjusting the osmolarity of the medium or solvent by dilution or addition of a osmotically active substance. Ionic strength may be adjusted by dilution or addition of a salt for instance. Further, nutrients, cofactors, vitamins and other such additives may be included to maintain a healthy bacterial population, if desired, see for example examples of such additives described in Lovley and Phillips, Appl. Environ. Microbiol., 54(6):1472-1480. Optionally, an aqueous medium in contact with anodophilic bacteria contains a dissolved substrate oxidizable by the bacteria.

In operation, reaction conditions include variables such as pH, temperature, osmolarity, and ionic strength of the medium in the reactor. In general, the pH of the medium in the reactor is between 2-10, inclusive, and preferably between 5-8.5 inclusive.

Reaction temperatures are typically in the range of about 10-40° C. for non-thermophilic bacteria, although the device may be used at any temperature in the range of 0 to 100° C. by including suitable bacteria for growing at selected temperatures. However, maintaining a reaction temperature above ambient temperature may require energy input and it is preferred to maintain the reactor temperature at about 15-25° C. without input of energy. A surprising finding of the present invention is that reaction temperatures in the range of 16-25° C., inclusive or more preferably temperatures in the range of 18-24° C., inclusive and further preferably in the range of 19-22° C., inclusive, allow hydrogen generation, electrode potentials, Coulombic efficiencies and energy recoveries comparable to reactions run at 32° C. which is generally believed to be an optimal temperature for anaerobic growth and metabolism, including oxidation of an organic material.

Ionic strength of a medium in a system of the present invention is preferably in the range of 50-500 millimolar, more preferably in the range of 75-450 millimolar inclusive, further preferably in the range of 100-400 millimolar, inclusive, and still further preferably in the range of 100-250 millimolar, inclusive.

Embodiments of inventive systems and methods are illustrated in the following examples. These examples are provided for illustrative purposes and are not considered limitations on the scope of inventive compositions and methods.

Example 1

Laboratory experiments were conducted using bacteria previously acclimated for growth on acetate in a two-chamber BEAMR reactor. The anode is an ammonia treated brush electrode that is enriched in over three cycles of solution replacement on acetate. The cathode is carbon cloth (ETEK, type B, 30% wet proofing) containing 0.5 mg Pt per square centimeter. The cathode is placed into the reactor with the catalyst facing toward the brush. The liquid volume of the reactor is 28 mL, containing 1 g/L sodium acetate in a 50 mM phosphate buffer solution, having a conductivity of 7.5 mS/cm$^2$.

A single chamber reactor is used for hydrogen production in this example. The single chamber reactor used included a gas space with a reversibly capped channel for communication between the gas space and the exterior of the housing. A brush anode is disposed in the interior space of the reactor housing along with a cathode. A flat carbon cloth cathode is made of 30% water proofed material with a Pt catalyst is used.

At an applied voltage of 0.5 V, the reactor produced a total of 31.88 mL of gas, and of this 30.76 mL is hydrogen gas based on hydrogen gas composition. This is a purity of 96.5%. No methane is detected, and carbon dioxide is measured as <1%, suggesting that hydrogen gas is actually >99% of the recovered gas. The efficiency of the process, evaluated in terms of the heat of combustion of the hydrogen gas produced compared to the electricity input (both on the basis of joules), is 334%. The Coulombic efficiency of the process, defined as the percent of electrons recovered from the acetate substrate, is 94%. Based on the energy content of the substrate degraded during a test (92%) and the heat of combustion of the hydrogen gas produced, the overall energy efficiency of the process is 93%. The current density produced in the system is 147

A/m³, and the hydrogen gas production rate normalized to reactor liquid volume, is 1640 liters of hydrogen gas per cubic meter of reactor per day.

Any patents or publications mentioned in this specification are incorporated herein by reference to the same extent as if each individual publication is specifically and individually indicated to be incorporated by reference. In particular, U.S. patent application Ser. Nos. 11/180,454 and 11/799,194 are hereby incorporated by reference in their entirety.

The systems and methods described herein are presently representative of preferred embodiments, exemplary, and not intended as limitations on the scope of the invention. Changes therein and other uses will occur to those skilled in the art. Such changes and other uses can be made without departing from the scope of the invention as set forth in the claims.

The invention claimed is:

1. A system for hydrogen gas generation, comprising:
   a hydrogen gas electrode assembly comprising a first anode and a first cathode;
   a microbial fuel cell electrode assembly comprising a second anode and a second cathode, the microbial fuel cell electrode assembly in electrical communication with the hydrogen gas electrode assembly for enhancing an electrical potential between the first anode and the first cathode; and
   a single chamber housing, the housing having a wall generally enclosing and defining an interior space adjacent an interior surface of the wall, and defining an exterior, the hydrogen gas electrode assembly disposed at least partially in the interior space, with the proviso that the system does not include an ion exchange membrane disposed between the first anode and the first cathode.

2. The system of claim 1, further comprising an aqueous medium disposed in the interior space, the aqueous medium partially filling the interior space and defining a gas space between the wall and the aqueous medium, wherein substantially no $O_2$ is present in the interior space.

3. The system of claim 2, wherein the aqueous medium comprises a chemical mediator for transfer of electrons generated by the plurality of bacteria to the anode.

4. The system of claim 2, further comprising a biodegradable organic substrate for oxidation by bacteria, the biodegradable organic substrate disposed in contact with the aqueous medium.

5. The system of claim 4, wherein the biodegradable organic fuel is wastewater.

6. The system of claim 1, further comprising a plurality of bacteria for oxidizing a biodegradable organic fuel in the housing.

7. The system of claim 6, wherein the plurality of bacteria comprises exoelectrogenic bacteria.

8. The system of claim 1, wherein one or more of the anodes and/or cathodes has a high specific surface area.

9. The system of claim 8, wherein the one or more of the anodes and/or cathodes having a high specific surface area has a specific surface area greater than $100$ $m^2/m^3$.

10. The system of claim 8, wherein the anode and/or cathode comprises one or more conductive fibers.

11. The system of claim 10, wherein the one or more conductive fibers is attached to a conductive core support.

12. The system of claim 11, wherein each individual fiber of the one or more conductive fibers is attached to the conductive core support.

13. The system of claim 11, wherein at least a portion of the one or more fibers comprises one or more carbon fibers.

14. The system of claim 1, further comprising a mixing apparatus for increasing hydrogen gas transfer from the cathode to the gas space.

15. The system of claim 1, further comprising a first channel disposed in the wall for communication between the interior space and the exterior.

16. A method of generating hydrogen gas, comprising:
   providing a biodegradable organic substrate to a plurality of bacteria disposed in the housing of a system for generating hydrogen gas according to claim 1; and
   applying a voltage to enhance an electrical potential between the first anode and the first cathode.

* * * * *